(12) United States Patent
Ishida

(10) Patent No.: US 7,798,517 B2
(45) Date of Patent: Sep. 21, 2010

(54) KNEE-PROTECTING AIRBAG APPARATUS

(75) Inventor: Ryotaro Ishida, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 275 days.

(21) Appl. No.: 12/078,365

(22) Filed: Mar. 31, 2008

(65) Prior Publication Data
US 2008/0238048 A1    Oct. 2, 2008

(30) Foreign Application Priority Data
Apr. 2, 2007    (JP)    ............... 2007-096786

(51) Int. Cl.
B60R 21/20    (2006.01)
(52) U.S. Cl. .................... 280/728.2; 280/732
(58) Field of Classification Search .............. 280/728.2, 280/732, 751
See application file for complete search history.

(56) References Cited

U.S. PATENT DOCUMENTS

| | | | | |
|---|---|---|---|---|
| 3,904,222 | A * | 9/1975 | Bursott et al. ............... | 280/732 |
| 5,071,162 | A * | 12/1991 | Takagawa .................... | 280/752 |
| 5,489,116 | A * | 2/1996 | Boag ........................ | 280/728.2 |
| 5,803,487 | A * | 9/1998 | Kikuchi et al. ........... | 280/728.2 |
| 5,927,755 | A * | 7/1999 | Matsuo et al. .............. | 280/752 |
| 6,883,833 | B2 * | 4/2005 | Yamazaki et al. ........... | 280/751 |
| 6,902,186 | B2 * | 6/2005 | Suzuki et al. ............ | 280/730.1 |
| 6,942,240 | B2 * | 9/2005 | Kornylo et al. .......... | 280/728.2 |
| 7,156,413 | B2 * | 1/2007 | Fischer et al. ............ | 280/728.2 |
| 7,261,318 | B2 * | 8/2007 | Enders ........................ | 280/732 |
| 7,290,787 | B2 * | 11/2007 | Hayakawa ................ | 280/728.2 |
| 7,370,879 | B2 * | 5/2008 | Hotta et al. .............. | 280/728.2 |
| 7,384,065 | B2 * | 6/2008 | Takimoto et al. ............ | 280/732 |
| 7,455,315 | B2 * | 11/2008 | Yokoyama ................ | 280/730.1 |
| 7,578,519 | B2 * | 8/2009 | Sakakida ................. | 280/730.2 |
| 7,597,345 | B1 * | 10/2009 | Kim ......................... | 280/728.2 |
| 7,604,250 | B2 * | 10/2009 | Hotta et al. .............. | 280/728.2 |
| 2004/0124617 | A1 * | 7/2004 | Morita ....................... | 280/732 |
| 2005/0173902 | A1 * | 8/2005 | Boxey ..................... | 280/730.2 |
| 2006/0186645 | A1 * | 8/2006 | Aulbach .................. | 280/728.2 |
| 2006/0255568 | A1 * | 11/2006 | Demel et al. ............. | 280/728.2 |
| 2007/0063490 | A1 * | 3/2007 | Minamikawa ........... | 280/728.2 |
| 2007/0241539 | A1 * | 10/2007 | Jang et al. ................ | 280/728.2 |

FOREIGN PATENT DOCUMENTS

JP    A-2005-096698    4/2005

* cited by examiner

*Primary Examiner*—Paul N Dickson
*Assistant Examiner*—Nicole Verley
(74) *Attorney, Agent, or Firm*—Posz Law Group, PLC

(57) ABSTRACT

The knee-protecting airbag apparatus includes an airbag module and a mounting bracket for fixing the airbag module on a vehicle body. The mounting bracket is provided with a mounting hole that is adapted to be fastened to a mounting seat of the vehicle body. The airbag module includes a retaining lug for fixing the airbag module tentatively on the vehicle body. When the retaining lug is engaged with a periphery of a retaining hole of the vehicle body, a rearward rotation moment is generated to rotate the airbag module about the engaging point of the retaining lug and periphery of the retaining hole, so that a pressing plane of the airbag module formed above the retaining lug abuts on and gets supported by a receiving plane formed on the vehicle body such that the mounting hole of the mounting bracket is positioned on a fastening location of the mounting seat of the vehicle body.

8 Claims, 11 Drawing Sheets

KNEE-PROTECTING AIRBAG APPARATUS

The present application claims priority from Japanese Patent Application No. 2007-096786 of Ishida, filed on Apr. 2, 2007 the disclosure of which is hereby incorporated into the present application by reference.

BACKGROUND OF THE INVENTION

1. Field of the Invention

The present invention relates to a knee-protecting airbag apparatus disposed in front of knees of an occupant seated in a seat, the apparatus including an airbag module having an airbag for inflation with inflation gas and a mounting bracket for mounting the airbag module on a vehicle body structure.

2. Description of the Related Art

A knee-protecting airbag apparatus is known in JP 2005-96698. The airbag apparatus includes a mounting bracket by which the apparatus is mounted on a vehicle. The mounting bracket has a mounting hole that is adapted to be fastened to a mounting seat on a vehicle body structure utilizing a fixing element.

However, since the mounting hole is formed proximate the upper edge of the mounting bracket, that is, above and rearward of the gravity point of the airbag module, an assembly worker has to support the airbag module by hand so that it may not fall down or lift rearward due to rotation moment at the mounting work on a vehicle body.

SUMMARY OF THE INVENTION

The object of the present invention is to provide a knee-protecting airbag apparatus that facilitates the mounting work on a vehicle.

In order to achieve the above object, the present invention provides a knee-protecting airbag apparatus comprising an airbag module including an inflatable airbag and a mounting bracket for mounting the airbag module on a vehicle body structure, the apparatus being configured such that a mounting hole of the mounting bracket that is formed above and at the rear of the gravity point of the airbag module is fastened to a mounting seat of the vehicle body structure to mount the airbag module on the vehicle body structure, wherein:

the airbag module includes:

a retaining lug disposed above the gravity point of the airbag module and below the mounting hole of the mounting bracket for fixing the airbag module on the vehicle body structure tentatively, the retaining lug being configured to project toward the vehicle body structure and bend to be oriented toward the airbag module at a leading end thereof for engagement with a periphery of a retaining hole formed on the vehicle body structure such that a rearward rotation moment is generated to rotate the airbag module about an engaging point of the retaining lug and the periphery of the retaining hole; and a pressing plane disposed above the retaining lug, the pressing plane abutting on and getting supported by a receiving plane formed on the vehicle body structure at the working of the rotation moment such that the mounting hole of the mounting bracket is positioned on a fastening location of the mounting seat of the vehicle body structure.

The configuration described above enables the airbag module to be mounted on the vehicle body structure by securing the periphery of the mounting hole of the mounting bracket to the mounting seat of the vehicle body structure by fixing means after the airbag module is tentatively fixed to the vehicle body structure using the retaining lug. Although the mounting hole of the mounting bracket is formed above and at the rear of the gravity point of the airbag module, the retaining lug is so configured below the mounting hole, that, when the retaining lug is engaged with the peripheral area of the retaining hole of the vehicle body, a rearward rotation moment is generated to rotate the airbag module about the engaging point of the retaining lug and the peripheral area of the retaining hole such that the pressing plane of the airbag module disposed above the retaining lug abuts on and gets supported by the receiving plane formed on the vehicle body structure and thereby the mounting hole is positioned on the fastening location of the mounting seat. That is, whenever the retaining lug is used to fix the airbag module on the vehicle body structure tentatively, the mounting hole of the mounting bracket is located on the fastening location of the mounting seat of the vehicle body structure, thereby stabilizing the position of the mounting hole of the mounting bracket relative to the mounting seat of the vehicle body. Consequently, in the mounting work of the airbag module on the vehicle body structure, the mounting bracket is positioned accurately relative to the vehicle body by merely attaching the module to the vehicle body tentatively using the retaining lug, without the necessity of supporting the module by hand, and the mounting work is facilitated.

Therefore, the airbag apparatus of the invention facilitates the mounting work on a vehicle.

In the above airbag apparatus, the pressing plane is desirably comprised of the periphery of the mounting hole of the mounting bracket so as to abut on the receiving plane that is disposed on the mounting seat. This configuration does not necessitate providing a separate pressing plane on the airbag module, and steadies the periphery of the mounting hole of the mounting bracket at tentative fixation by the retaining lug. Accordingly, the mounting work of the airbag module on the vehicle body structure will be further facilitated.

Further, if the airbag apparatus includes two of the mounting brackets on two interspaced positions on the left and right of the gravity point of the airbag module so that the retaining lug is formed below the mounting hole of each of the brackets, the retaining lugs will support the airbag module further stably on the vehicle body at the two locations on the left and right of the gravity point of the airbag module at the tentative fixation.

Moreover, the retaining lug is desirably formed by cutting and raising a part of the mounting bracket so as to be integral with the mounting bracket. This configuration will enable the retaining lug to be formed by press work or the like as part of the manufacturing of the mounting bracket, thereby improving the manufacturing work and reducing the manufacturing cost in comparison with an instance where the retaining lug is provided separately from the mounting bracket.

In addition, it is desired that the mounting bracket has a vertically elongated contour and is provided on both edges in the width direction with reinforcing ribs that project forward, and that the retaining lug is configured between the ribs to such size as not to project forward relative to the ribs. This configuration will provide the airbag apparatus easiness of handling since the retaining lug is prevented from engaging with surrounding members during transportation or the like.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
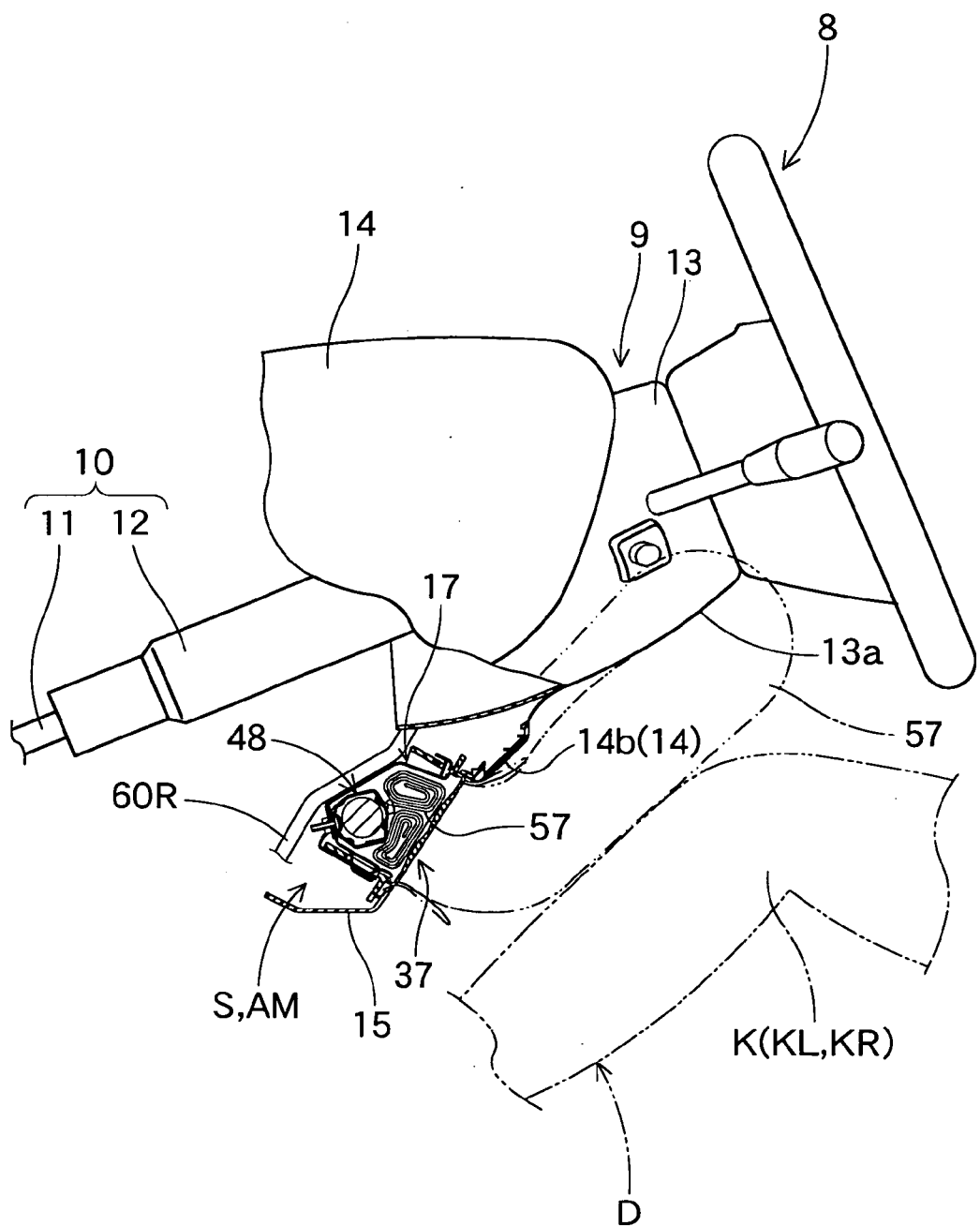
FIG. 1 is a schematic vertical section of a knee-protecting airbag apparatus embodying the present invention in service, taken along the anteroposterior direction of vehicle.
Figure 4:
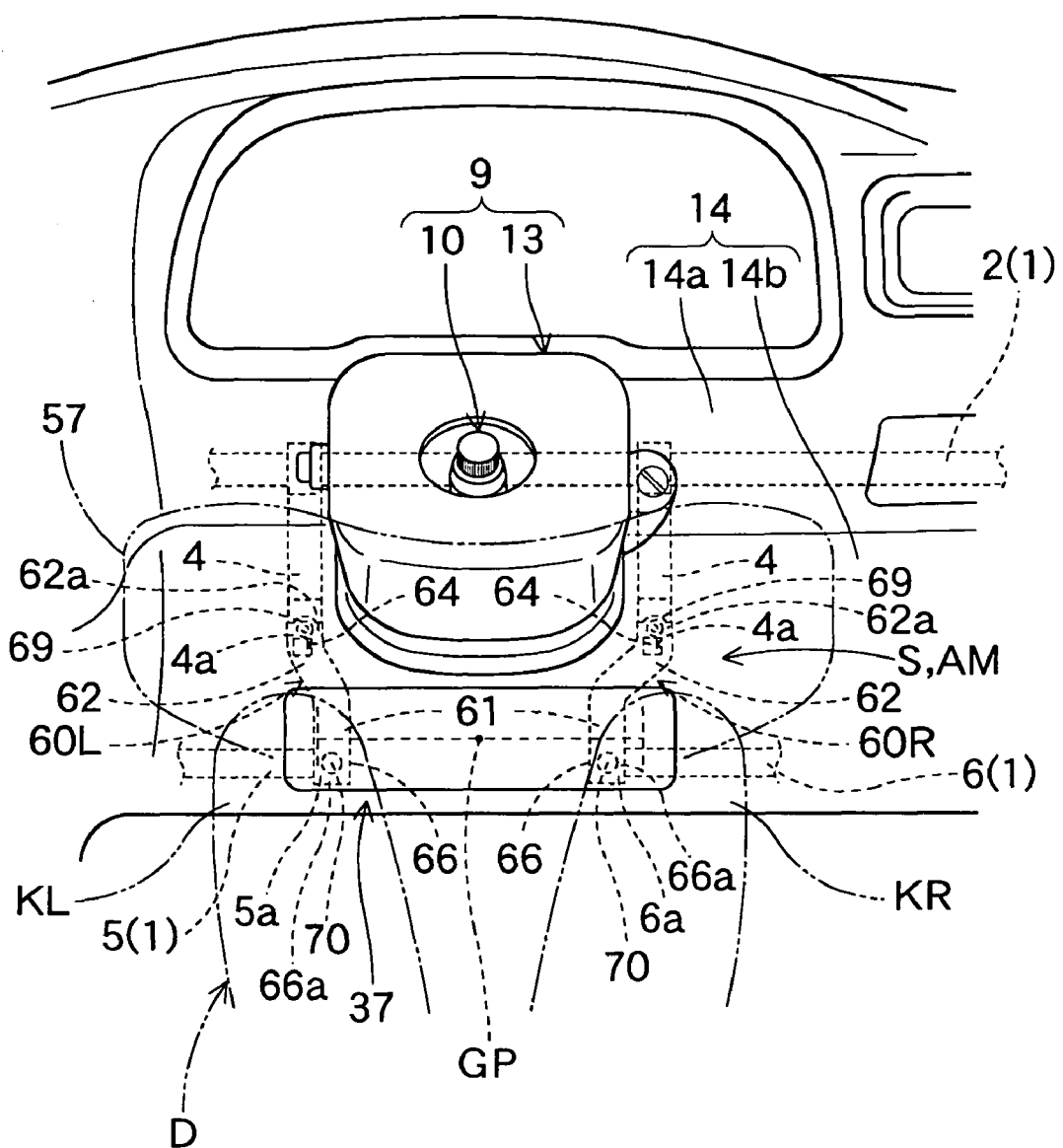
FIG. 4 is a schematic front view of the airbag apparatus of FIG. 1 in service as viewed from rearward.

As shown in FIGS. 1 and 4, a knee-protecting airbag apparatus S embodying the present invention is located below a steering column 9 in front of a driver's seat for protecting knees K (KL and KR) of a driver or occupant D. Up/down, left/right, and front/rear directions in this specification are intended to refer to up/down, front/rear, and left/right directions of a vehicle equipped with the airbag apparatus S.

As shown in FIGS. 1 and 4, the steering column 9 includes a column body 10 and a column cover 13. The column body 10 includes a main shaft 11 and a column tube 12 mounted around the main shaft 11.

The column cover 13 is made from synthetic resin and has a generally square tubular shape so arranged along the axial direction of the column body 10 as to cover the column body 10. A back surface 13a of a portion of the column cover 13 protruded from an instrument panel or dashboard 14 has a generally rectangular plate shape ascending rearward in a curved manner.

As shown in FIGS. 1 to 4, the airbag apparatus S includes an airbag module AM and mounting brackets 60L and 60R that are used to mount the airbag apparatus S on a vehicle body structure 1. The airbag module AM includes an airbag 57, an inflator 48 for supplying the airbag 57 with inflation gas, and a case 17 that houses the inflator 48 and airbag 57 in a folded state, an airbag cover 37 covering the back side of an opening 17a of the case 17.

Figure 2:
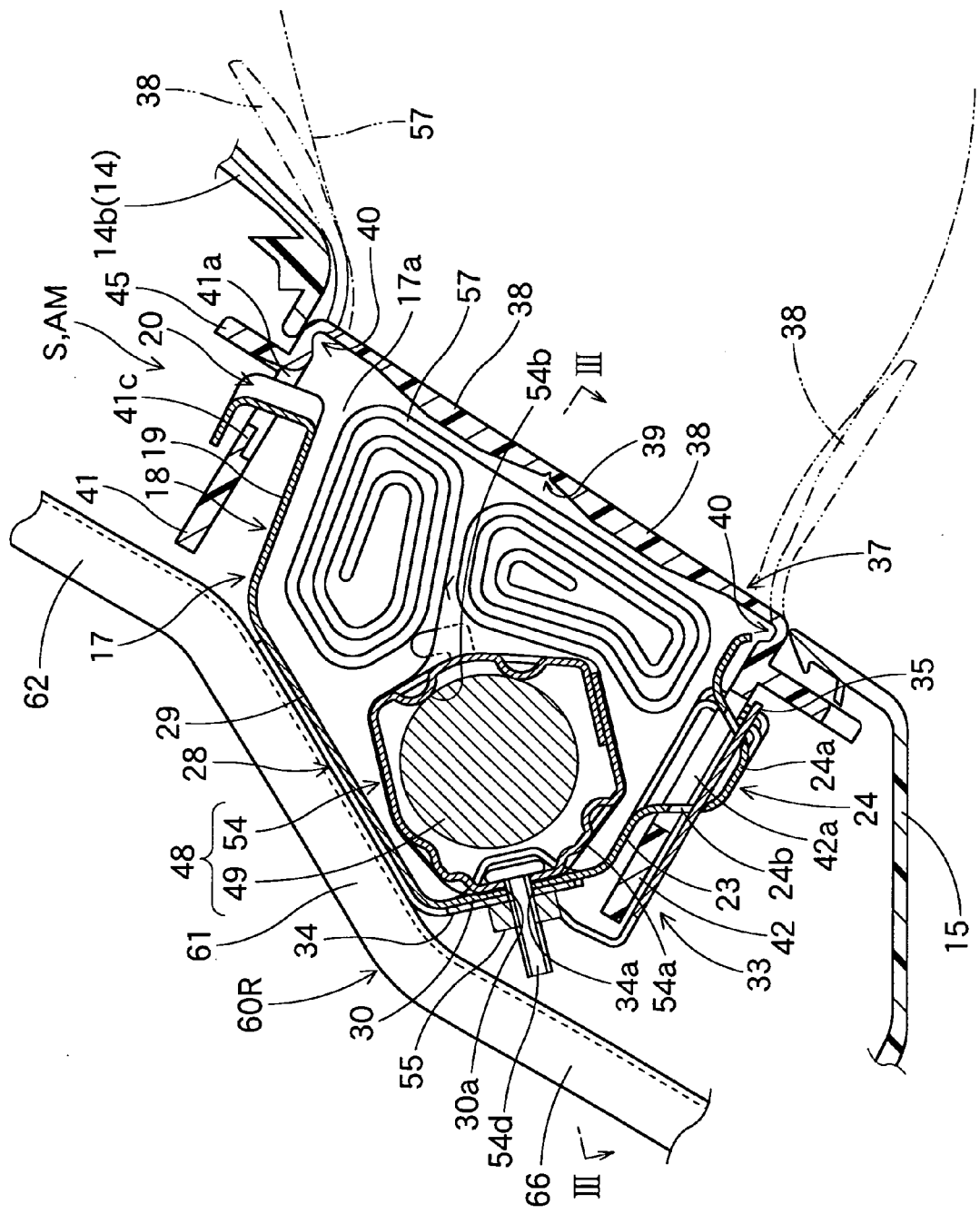
FIG. 2 is a schematic enlarged vertical section of the airbag apparatus of FIG. 1, taken along the anteroposterior direction of vehicle.
Figure 3:
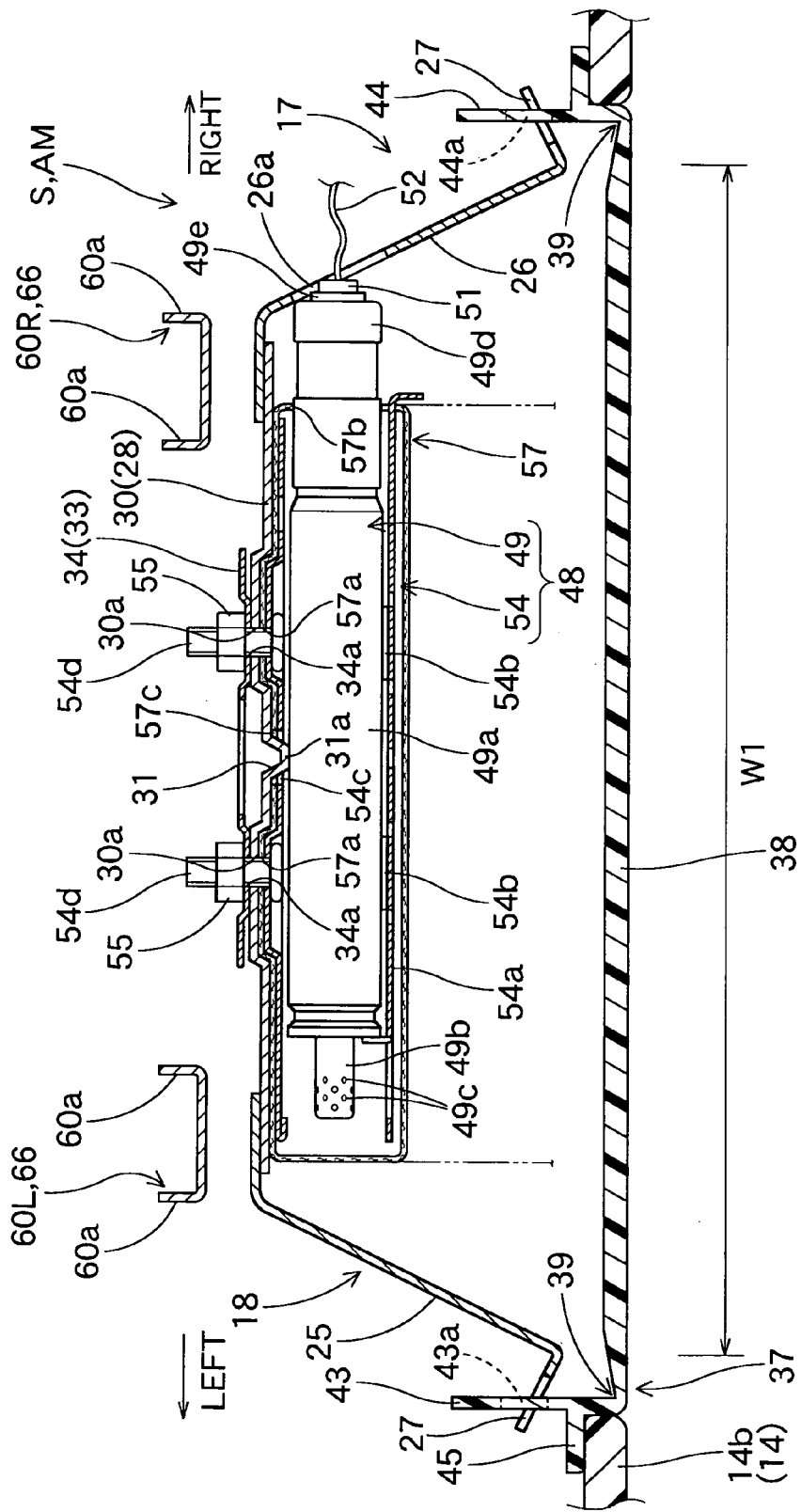
FIG. 3 is a schematic enlarged horizontal section taken along line III-III of FIG. 2.
Figure 5:
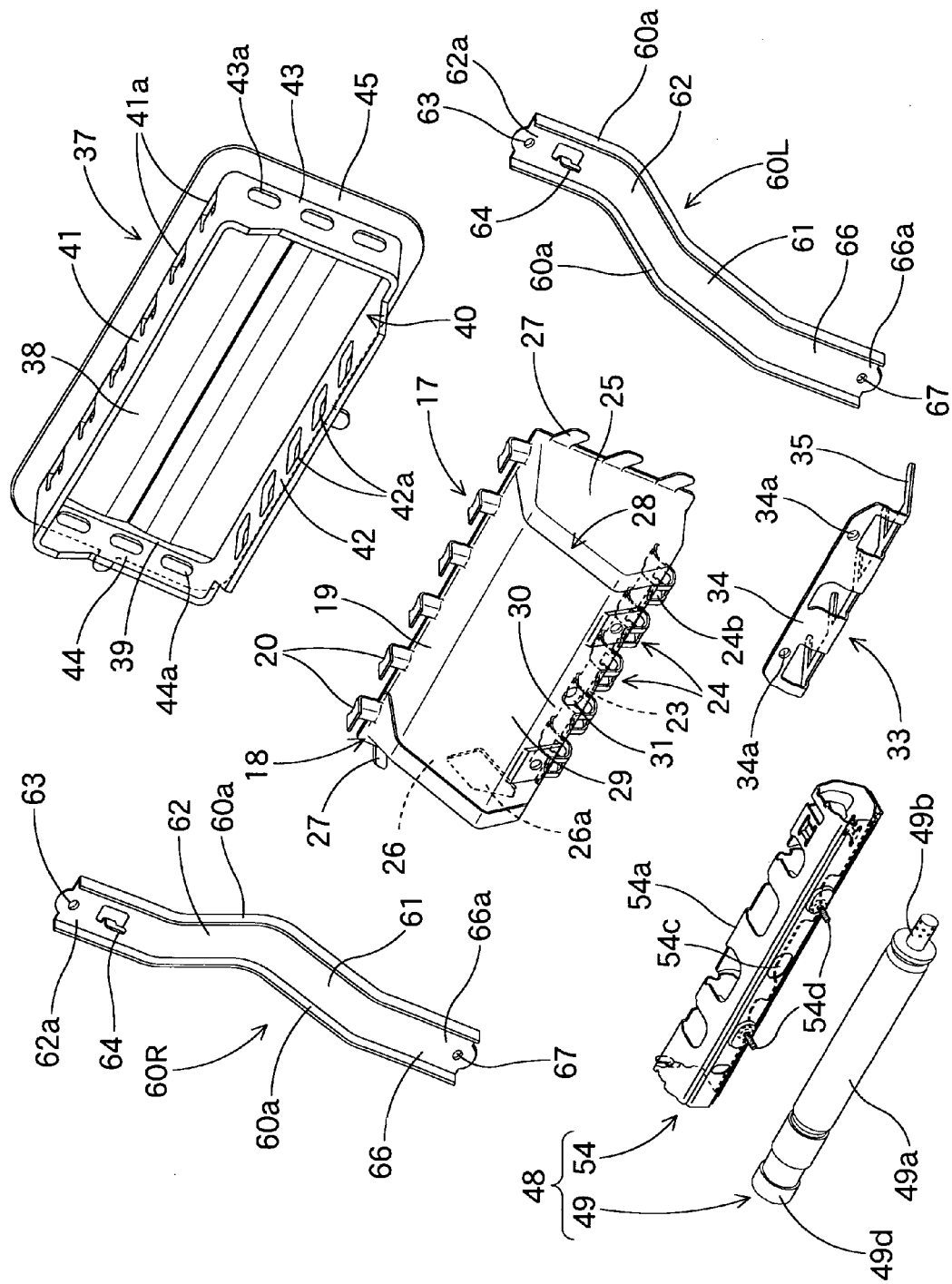
FIG. 5 is an exploded perspective view of an airbag cover, case, inflator and mounting brackets used in the airbag apparatus of FIG. 1 as viewed from the front.

As shown in FIGS. 1 to 3, the case 17 is made of sheet metal and disposed below the steering column 9. As shown in FIGS. 2, 3 and 5, the case 17 is formed into a box shape having an opening at the back. The case 17 includes a circumferential wall 18 having a generally square tubular shape, a bottom wall 28 closing the front side of the circumferential wall 18, and a generally rectangular opening 17a at the back side of the circumferential wall 18.

The circumferential wall 18 includes an upper wall 19 and lower wall 23 facing each other in the vertical direction and a left side wall 25 and right side wall 26 facing each other in the transverse direction. The upper wall 19 and lower wall 23 extend in parallel to each other and are disposed at such inclination that the rear ends are located at a lower level than the front ends as shown in FIGS. 1 and 2. The left side wall 25 and right side wall 26 are so configured to broaden toward the rear as shown in the horizontal section taken along the anteroposterior direction of FIG. 3. The width W1 (FIG. 3) at the vicinity of the rear ends of the left side wall 25 and right side wall 26, i.e. the lateral width W1 of the opening of the case 17 is configured to admit the airbag 57 folded up as houses the inflator 48 inside as translated forward from the opening 17a as indicated by double-dashed lines in FIG. 6.

Figure 6:
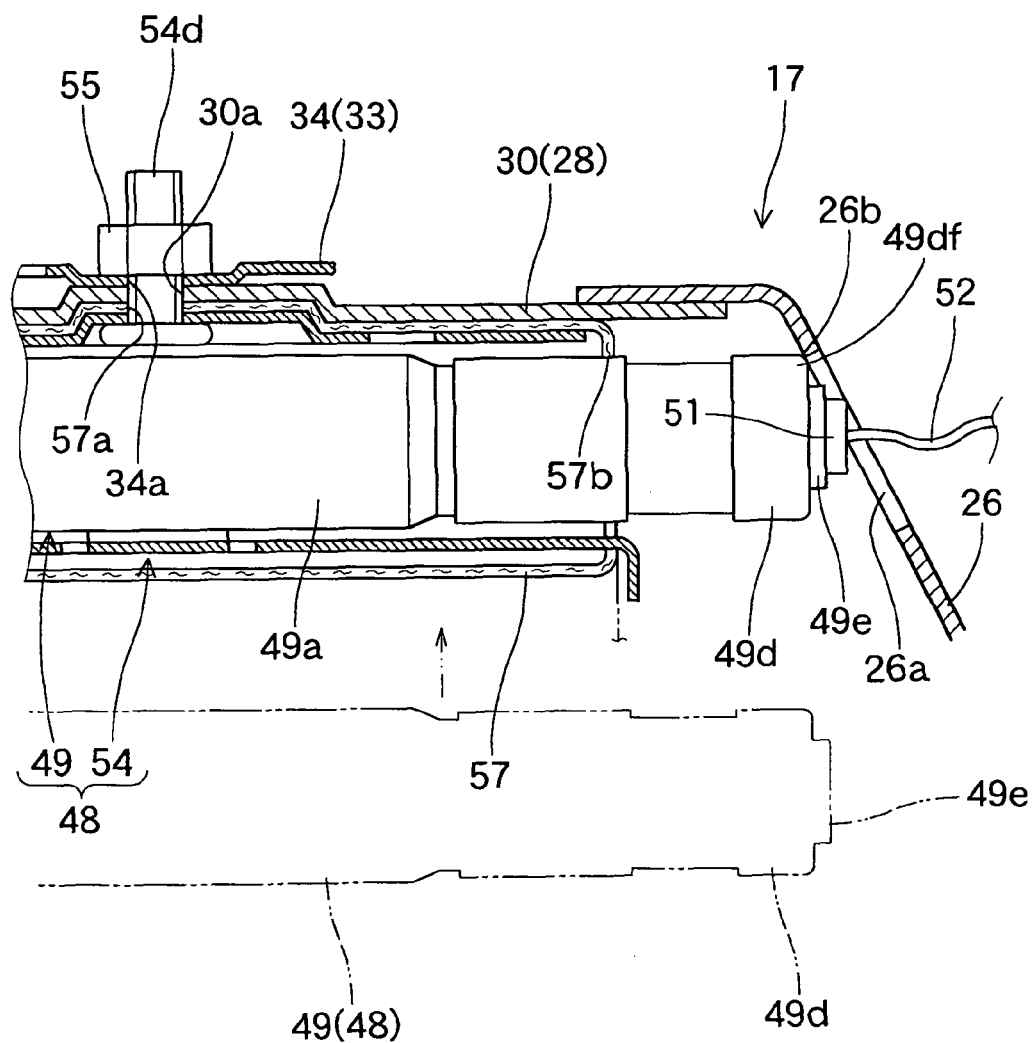
FIG. 6 is a partial enlarged horizontal section showing the vicinity of a joint port of the inflator of FIG. 5.
Figure 7:
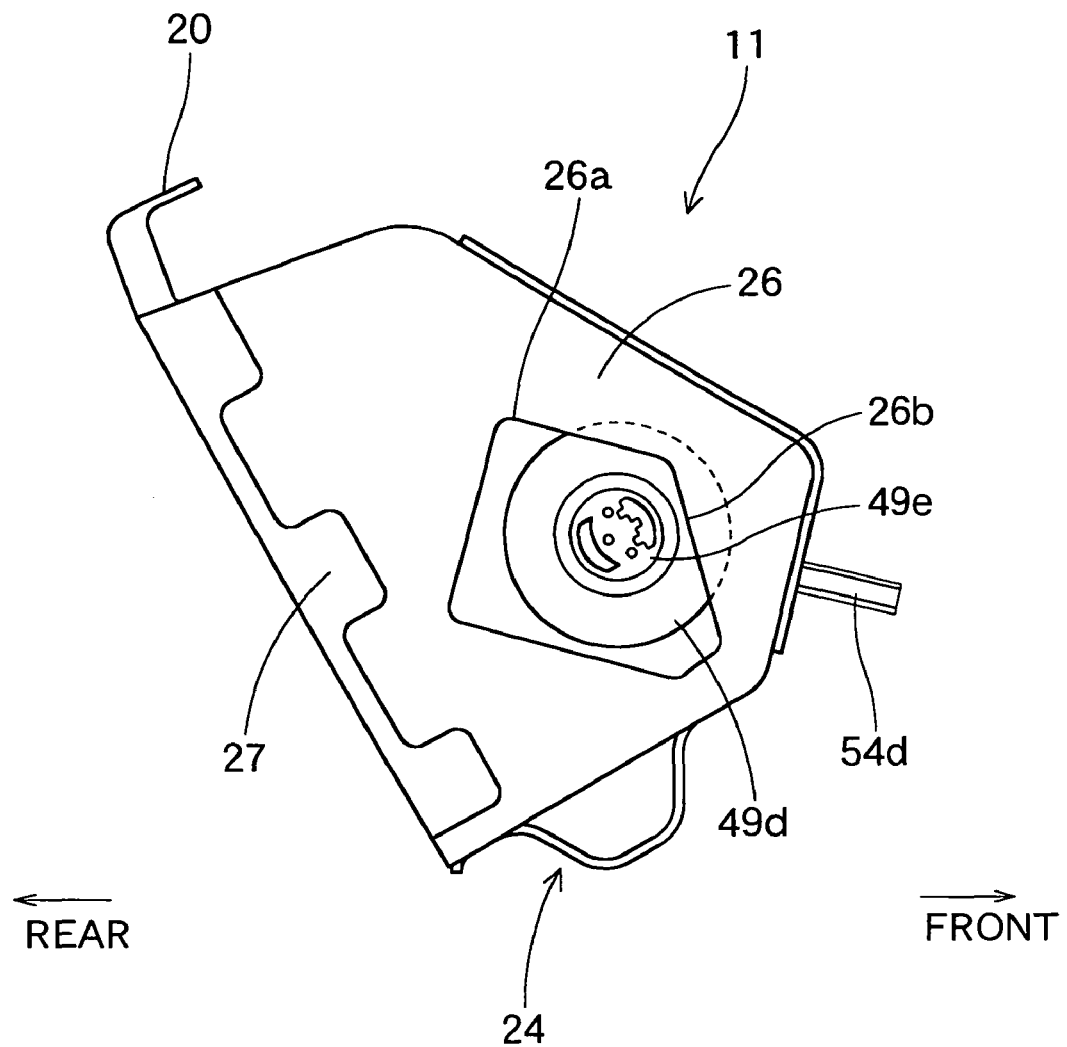
FIG. 7 is a right side view of the case of FIG. 5 as houses the inflator and an airbag there inside.

The right side wall 26 is provided with an aperture 26a that allows a later-described joint port 49e of the inflator 48 to be exposed when the inflator 48 and the airbag 57 are assembled with the case 17. The aperture 26a in this specific embodiment is formed into a rectangle approximate a trapezoid as shown in FIG. 7, and is sized to admit a later-described connector 51 (FIG. 3) joined to the joint port 49e of the inflator 48 but not a columnar body 49 of the inflator 48. In the illustrated embodiment, the inflator 48 is housed inside the case 17 such that a right front end 49df of the inflator body 49 abuts on a front peripheral edge 26b of the aperture 26a as shown in FIGS. 6 and 7. The oblique arrangement of the right side wall 26 that broadens rearward disposes an opening plane of the aperture 26a obliquely as well such that its rear end is positioned outside. This configuration enables the inflator 48 to be housed in the case 17 with no contact between the joint port 49e and the peripheral edge of the aperture 26a as shown in FIGS. 3 and 6 although the joint port 49e is formed to project slightly from the right end 49d of the inflator body 49. Moreover, since the aperture 26a is sized not to permit the inflator body 49 to pass therethrough, the right end 49d of the inflator body 49 is supported by the peripheral edge of the aperture 26a so that the inflator body 49 is securely prevented from falling out of the case 17 upon airbag deployment.

Figure 8:
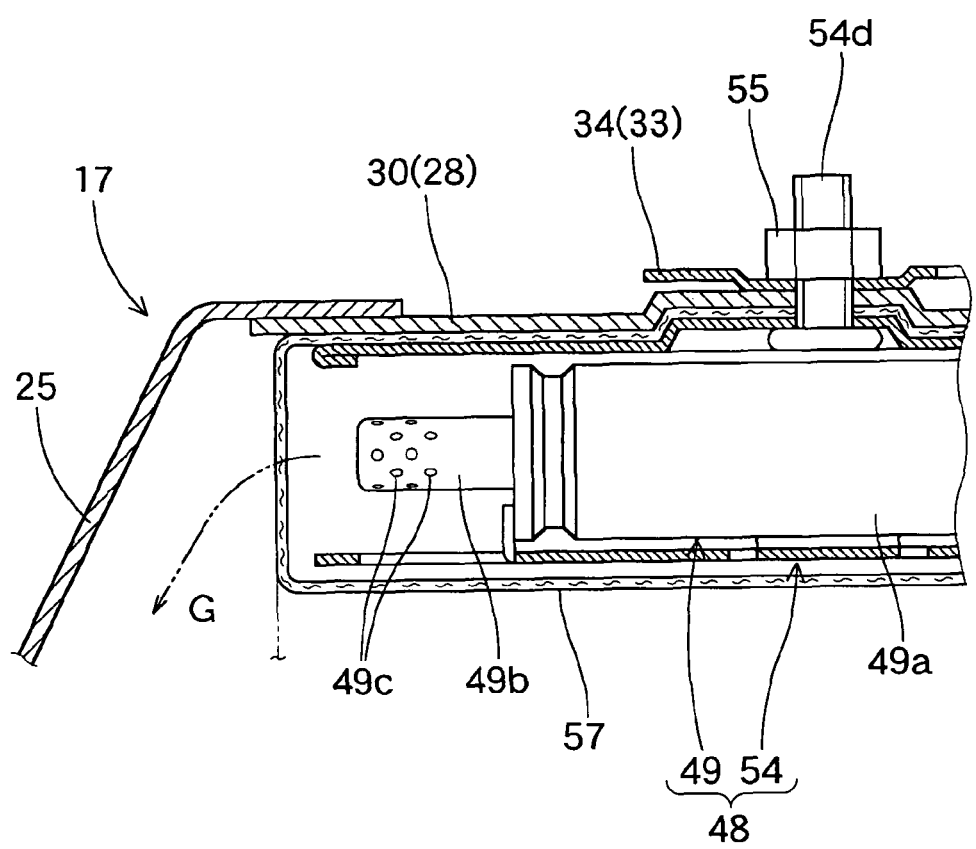
FIG. 8 is a partial enlarged horizontal section showing the vicinity of gas discharge ports of the inflator of FIG. 5.

As described later, gas discharge ports 49c of the inflator body 49 are positioned proximate the left side wall 25 that extends diagonally outward toward the rear as shown in FIG. 8. This configuration allows inflation gas G discharged from the discharge ports 49c to be directed outward in the transverse direction by an inner surface of the left side wall 25 upon airbag deployment, thereby unfurling the airbag 57 wide in the transverse direction in the initial phase of inflation.

Figure 9:
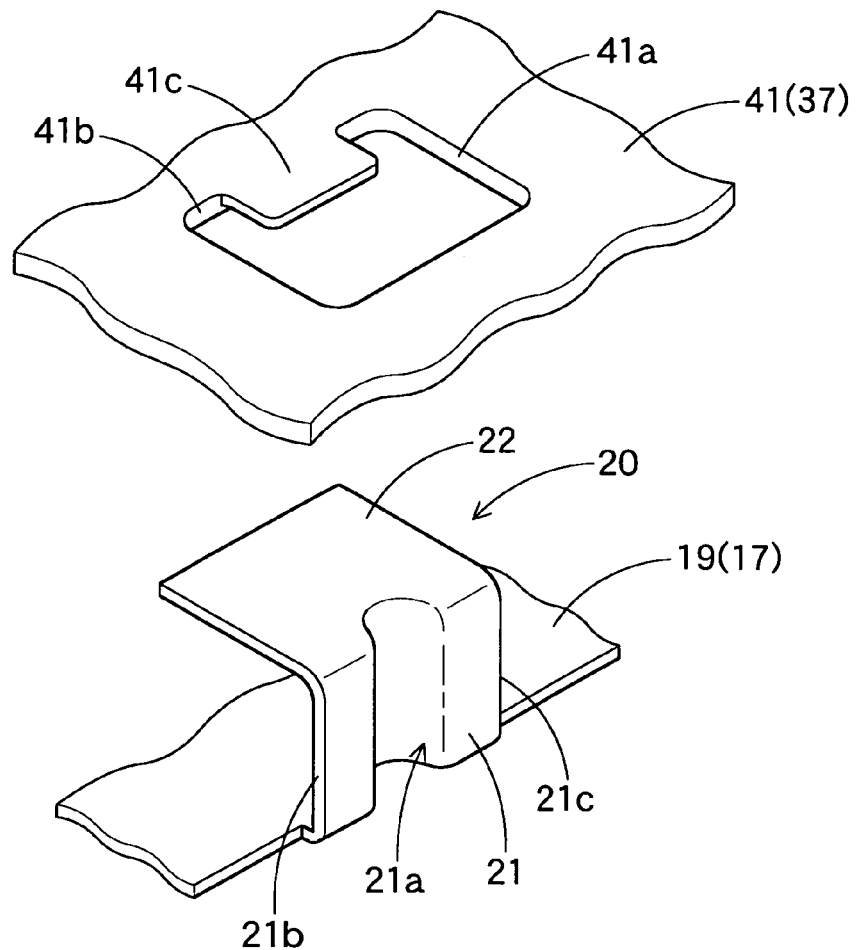
FIG. 9 is an exploded perspective view showing a lug of the case and a retaining hole of the airbag cover.

As best shown in FIG. 5, the upper wall 19 in the illustrated embodiment is provided on the rear edge with a plurality of lugs 20 arranged along the transverse direction for engagement with a later-described upper wall 41 of the airbag cover 37. In this embodiment, the lugs 20 are formed at six positions along the rear edge of the upper wall 19. Each of the lugs 20 projects upward from the rear edge of the upper wall 19 and then directed forward at the leading end, thereby having a generally L-shaped section as shown in FIG. 7. Specifically, each of the lugs 20 includes a shaft 21 oriented vertically and a pawl 22 extending forward from the leading end of the shaft 21. The shafts 21 are inserted through later-described retaining holes 41a formed on the upper wall 41 of the airbag cover 37 whereas the pawls 22 engage with peripheries of the retaining holes 41a. The shaft 21 is provided, at the lateral center and over the whole vertical length, with a reinforcing rib 21a that projects forward or inward and has a generally U-shaped section as shown in FIG. 9. The ribs 21a provide rigidity to the lugs 20.

Figure 10:
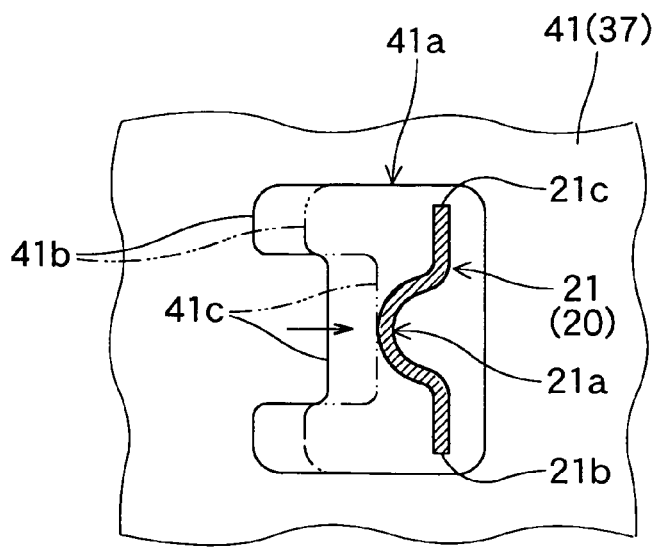
FIG. 10 is a partial enlarged section taken in parallel with an opening plane of the retaining hole of FIG. 9 showing the vicinity of the lug of the case and the retaining hole of the airbag cover.

Each of the retaining holes 41a of the airbag cover 37 includes at the front edge 41b a holding lug 41c that projects rearward as described later. When the airbag 57 upon deployment pushes and opens later-described door 38 of the airbag cover 37 so that the whole airbag cover 37 moves rearward along with the door 38 under pressure, this holding lug 41c abuts on the reinforcing rib 21a as indicated by double-dashed lines in FIG. 10 and helps prevent the front edge 41b of the retaining hole 41a from engaging with left and right ends 21b and 21c of the shaft 21 that are configured like edges. That is, this configuration will prevent damages to the front edge 41b of the retaining hole 41a due to engagement with edgy portions of the lugs 20, and therefore, help apply the pressure of the airbag 57 on a later-described tearable portion 39 properly so that the door 38 open smoothly.

As shown in FIGS. 5 and 7, the lower wall 23 is provided on the rear edge with a plurality of projections 24 arranged along the transverse direction for engagement with a later-described lower wall 42 of the airbag cover 37. In this embodiment, the projections 24 are formed at five positions along the rear edge of the lower wall 23 in such a manner as to project downward from the lower wall 23. Each of the projections 24 is set in a later-described retaining hole 42a formed on the lower wall 42 of the airbag cover 37 and assembled with the retaining hole 42a using a holding member 33 provided separate from the case 17. The projection 24 includes a raised portion 24a (FIG. 2) that protrudes downward from the lower wall 42 of the airbag cover 37 when the case 17 is assembled with the airbag cover 37. A slot 24b is formed through the raised portion 24a in the anteroposterior direction for receiving a later-described fork portion 35 of the holding member 33. Although the lower wall 23 of this embodiment includes the projections 24 for engagement with the retaining holes 42a using the holding member 33, the lower wall 23 may alternatively be provided with such lugs as the lugs 20 of the upper wall 19 instead of the projections 24.

Referring to FIGS. 3 and 5, the left side wall 25 and right side wall 26 are provided at the rear edges with retaining lugs 27 for engagement with retaining holes 43a and 44a formed on later-described left wall 43 and right wall 44 of the airbag cover 37. The retaining lugs 27 are formed at a plurality of (three, in this embodiment) positions along the vertical direction on each of the left side wall 25 and right side wall 26 in such a manner as to project forward diagonally. The retaining lugs 27 help position the airbag cover 37 against the case 17.

As shown in FIG. 2, the bottom wall 28 has such contour as is bent and project forward at a central area in the vertical direction and has a generally laid-down V-shaped section when taken anteroposteriorly. Two through holes 30a are formed on a lower region 30 of the bottom wall 28 side by side in the transverse direction for receiving bolts 54d of later-described retainer 54 of the inflator 48. Between the through holes 30a on the lower region 30 is a raised portion 31 that rises inward toward the inflator 48 as shown in FIG. 3. The raised portion 31 is formed into a generally truncated cone having a planar leading end 31a, and is inserted into an aperture 57c of the airbag 57 and through hole 54c of the retainer 54 as described later so as to abut on a later-described large-diameter portion 49a of the inflator body 49 at the leading end 31a, so that the retainer 54 clamps the inflator body 49 utilizing the leading end 31a of the bottom wall 28. Later-described mounting brackets 60L and 60R are fixed to the vicinities of left and right ends of an upper region 29 of the bottom wall 28 for mounting the airbag module AM on the body structure 1 of vehicle.

The holding member 33 is made of sheet metal and includes a fixing portion 34 arranged vertically and fork portions 35 acting as an insert portion 35 each of which is so arranged in the anteroposterior direction as to extend rearward from the bottom of the fixing portion 34. The holding member 33 of the illustrated embodiment includes five fork portions 35 along the transverse direction according to the configuration of the projections 24 of the lower wall 23 of the case 17. The fixing portion 34 is provided with two apertures 34a for receiving the bolts 54d of the retainer 54 of the inflator 48. By inserting each of the fork portions 35 into the slot 24b of the raised portion 24a of the projection 24 that projects downward from the lower wall 42 of the airbag cover 37 like locking bars, the holding member 33 prevents the projections 24 from disengaging from the retaining holes 42a of the lower wall 42. The holding member 33 is secured to the case 17 together with the inflator 48 by the bolts 54 and nuts 55 used to fix the inflator 48 to the case 17.

The airbag cover 37 is fabricated of thermoplastic elastomer of olefin or the like for covering the rear of the case 17. The airbag cover 37 is disposed on a lower panel 14b of the dashboard 14 that is comprised of an upper panel 14a and lower panel 14b as shown in FIG. 4, and includes a door 38 disposed proximate the opening 17a of the case 17, an upper wall 41, lower wall 42, left wall 43 and right wall 44 that are arranged along the circumferential wall 18 of the case 17 in such a manner as to project from the circumference of the door 38, and a peripheral region 45 that is arranged all along the circumference of the door 38 as best shown in FIG. 5.

The door 38 is formed into a rectangular plate shape that is slightly larger than the opening 17a of the case 17 for covering the opening 17a. The door 38 of the illustrated embodiment is configured openable vertically with a thinned tearable portion 39 formed around the door 38 in a generally H-shape as viewed from the rear and hinge portions 40 formed on the top and bottom of the door 38, about which hinge portions the door 38 opens.

As shown in FIG. 3, the peripheral region 45 is configured to recess one step forward relative to the door 38 in the circumference of the door 38. The peripheral region 45 supports a region of the lower panel 14b around the door 38 while evening rear sides of the door 38 and lower panel 14b.

The upper wall 41 is arranged generally along the upper wall 19 of the case 17 to adjoin the upper wall 19 from outside. The upper wall 41 includes six rectangular retaining holes 41a for engagement with the lugs 20 of the case 17. As described above, each of the retaining holes 41a is provided at the front edge 41b with the holding lug 41c that projects rearward for preventing the lug 20 from disengaging from the retaining hole 41a. The lower wall 42 is arranged generally along the lower wall 23 of the case 17 to adjoin the lower wall 23 from outside. The lower wall 42 is provided with five rectangular retaining holes 42a for engagement with the projections 24 of the case 17. The left wall 43 and right wall 44 extend along the anteroposterior direction on the outer side of the left side wall 25 and right side wall 26 of the case 17. Each of the walls 43 and 44 is provided proximate the rear end with three oval retaining holes 43a/44a for engagement with the retaining lugs 27.

The inflator 48 includes a generally columnar body 49 and a retainer 54 that is mounted around the body 49 for holding the body 49.

The body 49 is generally columnar in shape and is so disposed that its axial direction extends along the transverse direction. The body 49 includes a large-diameter portion 49a and a small-diameter portion 49b that projects from the first end of the large-diameter portion 49a. The small-diameter portion 49b is provided with numerous gas discharge ports 49c for discharging inflation gas. In the illustrated embodiment, the small-diameter portion 49b is located at the left end of the large-diameter portion 49a. The large-diameter portion 49a includes at the second or right end 49d a joint port 49e to which a connector 51 with a lead wire 52 is connected for feeding an actuating signal. The joint port 49e is configured in a slightly projecting manner relative to the right end 49d as shown in FIGS. 3 and 6. In this embodiment, the inflator body 49 is housed inside the case 17 having the right front end 49df abutted on the front peripheral edge 26b of the aperture 26a on the right side wall 26 of the case 17 and having the joint port 49e exposed from the aperture 26a.

The retainer 54 includes a generally tubular holding portion 54a that is made of sheet metal and mounted around the body 49 and two bolts 54d projecting forward from the holding portion 54a. The holding portion 54a is so disposed that its axial direction extends along the transverse direction, and includes at two locations corresponding to the bolts 54d on the region arranged at the rear of the body 49 contact regions 54b that are so recessed inward as to contact the outer circumference of the large-diameter portion 49a (FIG. 3). Between the bolts 54d on the front side of the holding portion 54a is a through hole 54c for receiving the raised portion 31 formed on the lower region 30 of the bottom wall 28 of the case 17. The retainer 54 holds the body 49 by clamping the body 49 with the leading end 31a of the raised portion 31 and contact regions 54b.

The airbag 57 is formed of flexible woven fabric of polyester, polyamide or the like. As indicated by double-dashed lines in FIGS. 1 and 4, the airbag 57 is formed into a generally rectangular plate shape at full inflation that has such lateral width as to protect both knees KL and KR of driver or occupant D. As shown in FIG. 3, the airbag 57 is provided at the lower end at full inflation with two apertures 57a for receiving the bolts 54d of the inflator 48, an aperture 57b for receiving the inflator body 49, and an aperture 57c for receiving the raised portion 31 of the bottom wall 28 of the case 17. The airbag 57 is attached to the case 17 in such a condition that peripheral edges of the apertures 57a are clamped between the holding portion 54a of the retainer 54 and the lower region 30 of the bottom wall 28 of the case 17 by fastening the bolts 54d inserted through the apertures 57a, the through holes 30a of the bottom wall 28 of the case 17 and apertures 34a of the fixing portion 34 of the holding member 33 with nuts 55 while the right end 49d of the body 49 is projected from the aperture 57b.

As best shown in FIG. 5, each of the mounting brackets 60L and 60R is made of sheet metal into a vertically elongated contour and provided on both edges in the width direction with reinforcing ribs 60a that project forward. As shown in FIG. 4, the brackets 60L and 60R are fixed to two interspaced locations on the left and right of the gravity point GP of the airbag module AM. In this specific embodiment, the brackets 60L and 60R are attached to the vicinities of the left and right ends of the upper region 29 of the bottom wall 28 of the case 17. As shown in FIG. 5, each of the brackets 60L and 60R includes an attachment region 61 fixed to and along the upper region 29, an upper mounting region 62 and lower mounting region 66 each of which extends obliquely and in parallel to the opening plane of the case 17 from the upper/lower end of the attachment region 61 such that the respective upper end is disposed rearward relative to the lower end.

Figure 12:
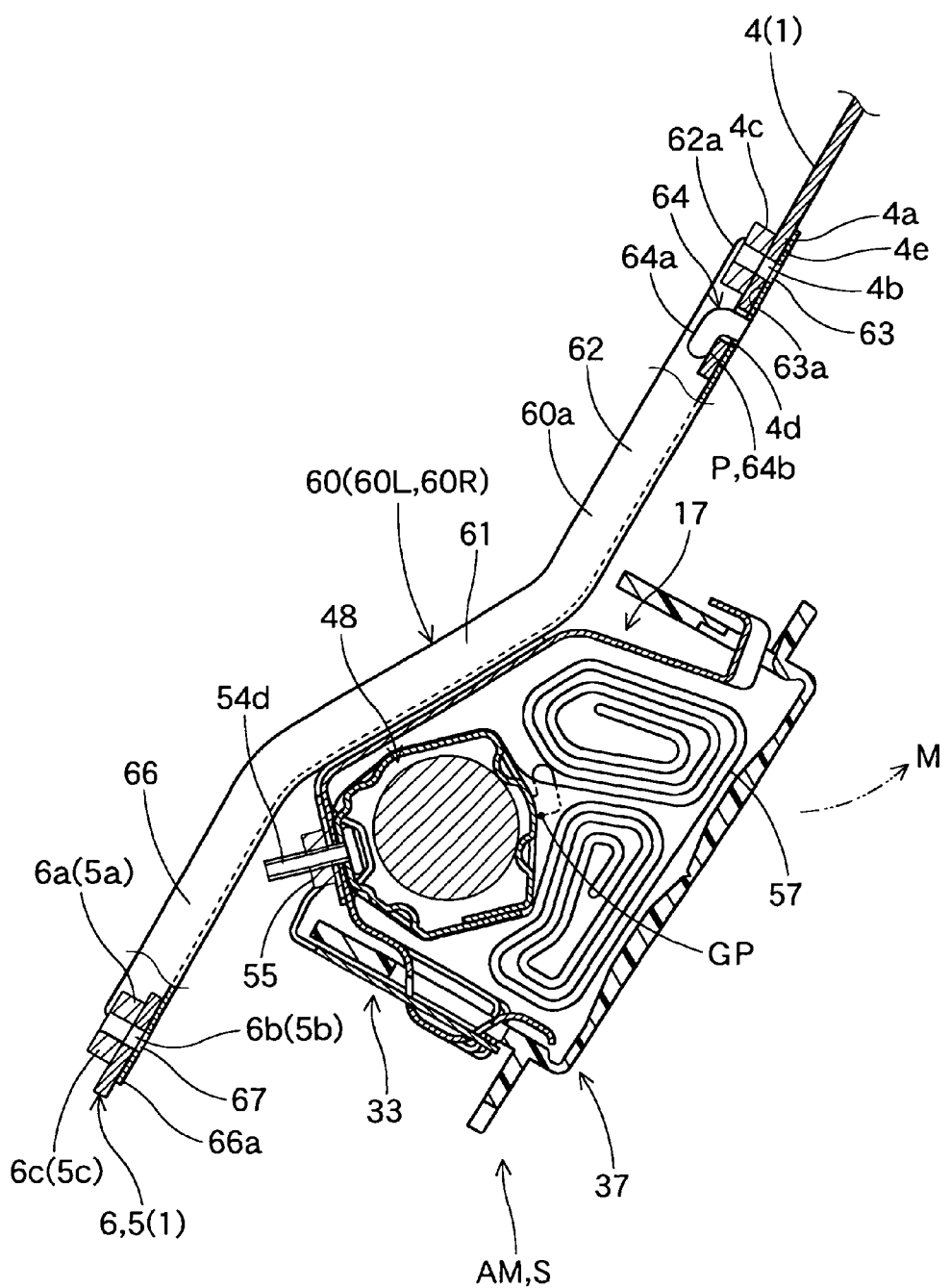
FIG. 12 is a schematic vertical section of an airbag module fixed to the bracket of vehicle body structure tentatively.

In the illustrated embodiment, as shown in FIG. 4, each of the upper mounting regions 62 extends obliquely in the horizontal direction as well such that the distal end or upper end 62a is located outward in the horizontal direction relative to the attachment region 61 as viewed from the rear. The upper end 62a of each of the upper mounting regions 62 is adapted to be secured to a mounting seat 4a formed on a bracket 4 extending from a dashboard reinforcement 2 as part of the vehicle body structure 1 using a bolt 69 acting as fixing means, and is provided with a mounting hole 63 (FIG. 5) for receiving the bolt 69. As shown in FIG. 4, the brackets 4 extend forward from two locations on the dashboard reinforcement 2 that are interspaced in the horizontal direction and on the left and right of the airbag apparatus S. At least a region around the mounting seat 4a of each of the brackets 4 is configured to correspond to a peripheral area of the mounting hole 63 of the upper mounting region 62 in contour as shown in FIG. 12. The mounting seat 4a of each of the brackets 4 is provided with an insert hole 4b for receiving the bolt 69 and a nut 4c fixed to the periphery of the through hole 4b for fastening the bolt 69.

Referring to FIG. 4, the lower mounting region 66 is configured such that the distal end or lower end 66a is located immediately below the attachment region 61 as viewed from the rear. The lower end 66a of each of the lower mounting regions 66 is adapted to be secured to a mounting seat 5a/6a formed on a bracket 5/6 extending from unillustrated center brace or front body pillar as part of the vehicle body structure 1 using a bolt 70 acting as fixing means, and is provided with a mounting hole 67 (FIG. 5) for receiving the bolt 70. At least regions around the mounting seats 5a and 6a of the brackets 5 and 6 are configured to correspond to peripheral areas of the mounting holes 67 of the lower mounting regions 66 in contour as shown in FIG. 12. The mounting seat 5a/6a of each of the brackets 5/6 is provided with an insert hole 5b/6b for receiving the bolt 70 and a nut 5c/6c fixed to the periphery of the through hole 5b/6b for fastening the bolt 70.

Figure 11:
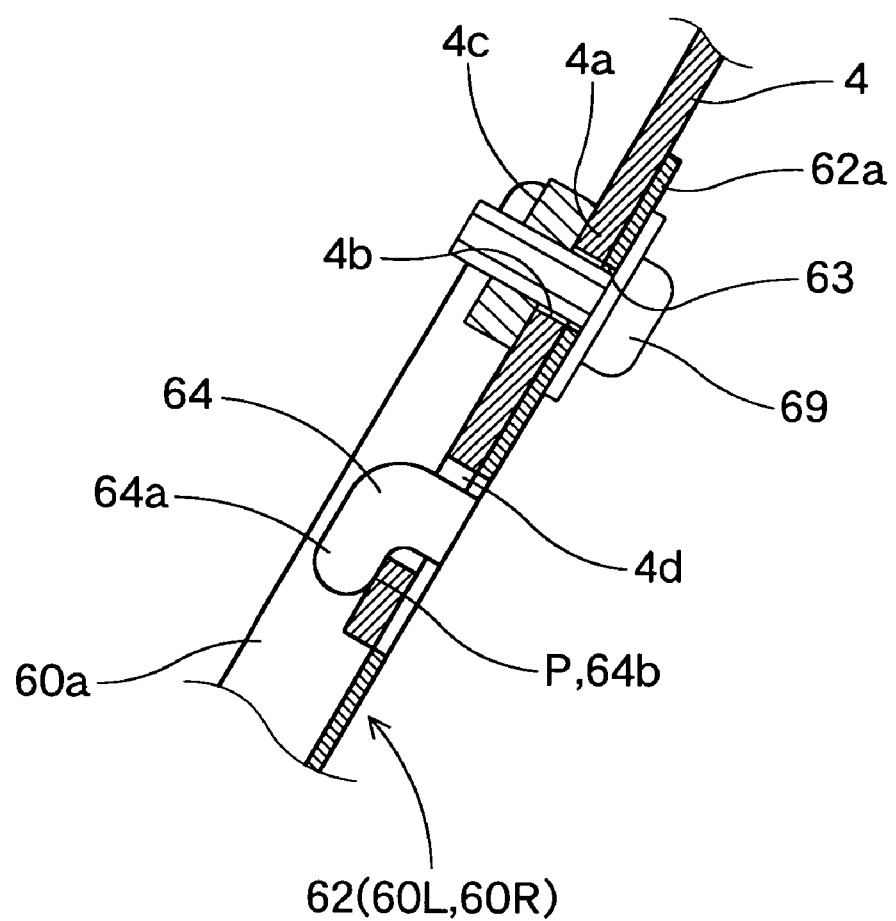
FIG. 11 is a partial enlarged vertical section showing the engagement of the mounting bracket of FIG. 5 and a bracket as part of the vehicle body structure.

As shown in FIGS. 5 and 11, each of the upper mounting regions 62 includes below the mounting hole 63 a retaining lug 64 for mounting the airbag module AM on the bracket 4 of the vehicle body structure 1 tentatively. The retaining lug 64 is formed by cutting and raising a part of the upper mounting region 62 so as to be integral with the upper mounting region 62. The retaining lug 64 is configured to project forward toward the bracket 4 and bend to be oriented downward toward the case 17 (toward the airbag module AM) at the leading end 64a so that the leading end 64a engages with the periphery of a retaining hole 4d of the bracket 4. The retaining lug 64 is located on such position as to generate a rearward rotation moment M as indicated by double-dashed line in FIG. 12 to rotate the airbag module AM about an engaging point of the retaining lug 64 and the periphery of the retaining hole 4d (specifically, the rear side 64b of the leading end 64a of the retaining lug 64) or supporting point P when the lug 64 engages with the retaining hole 4d of the bracket 4 to mount the airbag module AM tentatively. Moreover, the retaining lug 64 is configured to help position the mounting hole 63 of the bracket 60L/60R on a fastening location of the mounting seat 4a of the bracket 4 and the mounting hole 67 on a fastening location of the mounting seat 5a/6a of the bracket 5/6 extending from the vehicle body structure 1 when the rotation moment M is exerted by applying an area of the airbag module AM above the retaining lug 64, i.e. the periphery of the mounting hole 63 acting as pressing plane 63a, on a receiving plane 4e disposed around the insert hole 4b of the mounting seat 4a of the bracket 4 as shown in FIG. 12. More specifically, in this embodiment, when the airbag module AM is tentatively mounted on the brackets 4 by the retaining lugs 64, the pressing planes 63a comprised of the peripheries of the mounting holes 63 of the mounting brackets 60L and 60R abut on and get supported by the receiving planes 4e or the peripheries of the insert holes 4b of the mounting seats 4a of the brackets 4 as shown in FIG. 12. Then the mounting holes 63 are located on positions consistent to the insert holes 4b of the mounting seats 4a of the brackets 4, i.e., on such positions that the mounting hole 63 and insert hole 4b are proximate each other sharing an axial center, while the mounting holes 67 are located on positions consistent to the through holes 5b and 6b of the mounting seats 5a and 6a, i.e., on such positions that the mounting hole 67 and through hole 5b/6b are proximate each other sharing an axial center. Further, each of the retaining lugs 64 is so configured as not to project forward relative to the ribs 60a on both edges of the mounting brackets 60L and 60R, and therefore, provides the airbag apparatus S easiness of handling including transportation.

Assembling of the airbag module AM is now described. The mounting brackets 60L and 60R have been fixed to the case 17. Firstly, the inflator 48 is housed inside the airbag 57 such that the bolts 54d of the retainer 54 project from the apertures 57a whereas the joint port 49e is exposed from the aperture 57b. The airbag 57 is folded up from this state so as to fit in the case 17. Then the folded-up airbag 57 is wrapped by a tearable wrapping member (not shown) for keeping the folded-up configuration. At this time, the bolts 54d and joint port 49e of the inflator 48 are taken out of the wrapping member.

Subsequently, the folded-up airbag 57 is set in the case 17 that has been coupled with the mounting brackets 60L and 60R from the opening 17a such that the bolts 54d project from the through holes 30a of the case 17. Then the airbag cover 37 is assembled with the case 17 by having the retaining lugs 20 and 27 of the case 17 engaged with peripheries of the retaining holes 41a, 43a and 44a of the airbag cover 37 and inserting the projections 24 into the retaining holes 42a. Then the holding member 33 is set in place from the front side of the case 17 by inserting the fork portions 35 into the slots 24b of the projections 24 projecting from the lower wall 42 of the airbag cover 37 and putting the bolts 54d into the through holes 34a of the fixing portion 34, and which bolts 54d are fastened with the nuts 55. Thus the air bag module AM (the airbag apparatus S) is completed.

Thereafter, the finished airbag module AM (the airbag apparatus S) is mounted on the vehicle body 1 tentatively by insetting the retaining lugs 64 of the mounting brackets 60L and 60R that have been fixed to the case 17 into the retaining holes 4d of the brackets 4 of the vehicle body 1. Thereafter, on the upper mounting regions 62 of the mounting brackets 60L and 60R, the peripheral areas of the mounting holes 63 positioned to match with the insert holes 4b of the mounting seats 4a of the brackets 4 are fastened to the mounting seats 4a by the bolts 69. On the lower mounting regions 66, the peripheral areas of the mounting holes 67 positioned to match with the insert holes 5b/6b of the mounting seats 5a/6a of the brackets 5/6 are fastened to the mounting seats 5a/6a by the bolts 70. Thus the airbag module AM is secured to the vehicle body 1. In the meantime, the connector 51 having the lead wire 52 is connected to the joint port 49e of the inflator 48 that is exposed from the aperture 26a of the case 17. If then the dashboard 14 and an under cover 15 (FIGS. 1 and 2) are assembled, the airbag apparatus S is mounted on the vehicle.

After the airbag apparatus S is mounted on the vehicle, if an actuating signal is fed to the inflator 48 via the lead wire 52, inflation gas is discharged from the gas discharge ports 49c and flows into the airbag 57. Then the airbag 57 inflates and breaks the wrapping member, pushes the door 38 of the airbag cover 37, and breaks the breakable portion 39 so that the door 38 opens upward and downward around the hinge portions 40. Thus the airbag 57 deploys as indicated by double-dashed lines in FIGS. 1 and 4.

The airbag apparatus S embodying the invention is capable of being mounted on the vehicle body structure 1 by securing the peripheries of the mounting holes 63 and 67 of the mounting brackets 60L and 60R to the mounting seats 4a, 5a and 6a of the brackets 4, 5 and 6 as part of the vehicle body structure 1 by the bolts 69 and 70 after the mounting brackets 60L and 60R are tentatively attached to the brackets 4 using the retaining lugs 64. Although the mounting holes 63 of the mounting brackets 60L and 60R are formed above and at the rear of the gravity point GP of the airbag module AM, the retaining lugs 64 are disposed below the mounting holes 63. With this configuration, when the retaining lugs 64 are engaged with the peripheral areas of the retaining holes 4d of the brackets 4, which peripheral areas will act as the supporting points P, the rearward rotation moment M acts to rotate the airbag module AM about the supporting points P such that the area of the airbag module AM above the retaining lugs 64 acting as the pressing planes 63a, i.e. the peripheral areas of the mounting holes 63, abut on and get supported by the receiving planes 4e or the peripheries of the insert holes 4b of the mounting seats 4a of the brackets 4. Then the mounting holes 63 are set on the fastening location of the mounting seats 4a of the brackets 4, while the mounting holes 67 are set on the fastening location of the mounting seats 5a and 6a of the brackets 5 and 6.

That is, as shown in FIG. 12, when the pressing planes 63a comprised of the peripheries of the mounting holes 63 that are located above the retaining lugs 64 of the mounting brackets 60L and 60R abut on and get supported by the receiving planes 4e comprised of the peripheries of the insert holes 4b of the mounting seats 4a of the brackets 4, the mounting holes 63 are located on positions consistent to the insert holes 4b of the mounting seats 4a of the brackets 4, i.e., on such positions that the mounting hole 63 and insert hole 4b are proximate each other sharing an axial center, while the mounting holes 67 are located on positions consistent to the insert holes 5b and 6b of the mounting seats 5a and 6a, i.e., on such positions that the mounting hole 67 and insert hole 5b/6b are proximate each other sharing an axial center. In other words, the retaining lugs 64 help position the peripheries of the mounting holes 63 and 67 of the mounting brackets 60L and 60R accurately relative to the insert holes 4a, 5a and 6a of mounting seats 4a, 5a and 6a of the brackets 4, 5 and 6 constantly, thereby stabilizing the positions of the mounting holes 63 and 67 of the mounting brackets 60L and 60R relative to the mounting seats 4a, 5a and 6a. Consequently, in the mounting work of the airbag module AM on the vehicle body 1, the mounting brackets 60L and 60R are correctly positioned relative to the vehicle body 1 by merely attaching the module AM to the vehicle body 1 tentatively using the retaining lugs 64, without the necessity of supporting the module AM by hand, and the airbag module AM is mounted on the vehicle body 1 easily and smoothly by merely holding an electric screwdriver provided with the bolts 69, 70 on the leading end by hand and fastening the bolts 69, 70 into the nuts 4c, 5c, 6c.

Therefore, the airbag apparatus S of the invention facilitates the mounting work on a vehicle.

In the airbag apparatus S of the invention, moreover, the pressing plane 63a is comprised of the periphery of the mounting hole 63 of each of the mounting brackets 60L and 60R so as to abut on the receiving plane 4e that is disposed on the periphery of the through hole 4b of each of the mounting seat 4a. This configuration does not necessitate providing a separate pressing plane on the airbag module AM, and steadies the peripheries of the mounting holes 63 of the mounting brackets 60L and 60R at tentative fixation by the retaining lugs 64. Accordingly, the mounting work of the airbag module AM on the vehicle body structure 1 will be further facilitated. If such advantages does not have to be considered, the pressing plane 63a may alternatively be formed separately on a position above the retaining lugs 64 of the mounting brackets 60L and 60R so as to be received by the receiving plane on the vehicle body.

In the airbag apparatus S of the foregoing embodiment, the mounting brackets 60L and 60R are located on two interspaced positions on the left and right of the gravity point P of the airbag module AM and the retaining lugs 64 are formed below the mounting holes 63 of the brackets 60L and 60R. With this configuration, the retaining lugs 64 support the airbag module AM further stably on the vehicle body 1 at the two locations on the left and right of the gravity point GP of the airbag module AM at the tentative fixation. If such advantage does not have to be considered, the retaining lug may be formed at one position on the vicinity of the lateral center of the airbag module AM. Although the retaining lugs 64 in this specific embodiment are formed on the mounting brackets 60L and 60R, it will also be appreciated to form the retaining lug separately from the mounting brackets, for example such that it extends from the case.

Moreover, in the airbag apparatus S, the retaining lug 64 is formed by cutting and raising a part of the mounting bracket 60L/60R so as to be integral with the mounting bracket 60L/60R. This configuration will enable the retaining lugs 64 to be formed by press work or the like as part of the manufacturing of the mounting brackets 60L and 60R, thereby improving the manufacturing work and reducing the manufacturing cost in comparison with an instance where the retaining lug is provided separately from the mounting bracket.

Furthermore, each of the mounting brackets 60L and 60R of the foregoing embodiment is provided on both edges in the width direction with the reinforcing ribs 60a that project forward and the retaining lug 64 is configured between the ribs 60a to such size as not to project forward relative to the ribs 60a. This configuration will prevent the retaining lugs 64 from engaging with surrounding members during transportation or the like, thereby providing easiness of handling.

Although the foregoing embodiment has been described as applied to the knee-protecting airbag apparatus S disposed in front of a driver's seat, the invention may be applied to a knee-protecting airbag apparatus disposed in front of a front passenger's seat for protecting knees of a front-seat passenger.

What is claimed is:

1. A knee-protecting airbag apparatus comprising an airbag module including an inflatable airbag and a mounting bracket for mounting the airbag module on a vehicle body structure, the apparatus being configured such that a mounting hole of the mounting bracket that is formed above and at the rear of the gravity point of the airbag module is fastened to a mounting seat of the vehicle body structure to mount the airbag module on the vehicle body structure, wherein:

the airbag module includes:

a retaining lug disposed above the gravity point of the airbag module and below the mounting hole of the mounting bracket for fixing the airbag module on the vehicle body structure tentatively, the retaining lug being configured to project toward the vehicle body structure and bent to be oriented toward the airbag module at a leading end thereof for engagement with a periphery of a retaining hole formed on the vehicle body structure such that a rearward rotation moment is generated to rotate the airbag module about an engaging point of the retaining lug and the periphery of the retaining hole; and a pressing plane disposed above the retaining lug, the pressing plane abutting on and getting supported by a receiving plane formed on the vehicle body structure at the working of the rotation moment such that the mounting hole of the mounting bracket is positioned on a fastening location of the mounting seat of the vehicle body structure.

2. The knee-protecting airbag apparatus according to claim 1, wherein the pressing plane is disposed at the periphery of the mounting hole of the mounting bracket so as to abut on the receiving plane disposed on the mounting seat.

3. The knee-protecting airbag apparatus according to claim 1, including two of the mounting brackets at two interspaced positions on the left and right of the gravity point of the airbag module such that the retaining lug is formed below the mounting hole of each of the mounting brackets.

4. The knee-protecting airbag apparatus according to claim 3, wherein each of the retaining lugs is configured by cutting and raising a part of the mounting bracket so as to be integral with the mounting bracket.

5. The knee-protecting airbag apparatus according to claim 3, wherein the retaining lug is arranged proximate to the mounting hole of each of the mounting brackets.

6. The knee-protecting airbag apparatus according to claim 3, wherein the pressing plane is disposed at the periphery of the mounting hole of each of the mounting brackets so as to abut on the receiving plane disposed on the mounting seat, and the pressing planes formed at each of the mounting brackets are arranged in parallel to each other.

7. The knee-protecting airbag apparatus according to claim 3, wherein the pressing plane is disposed at the periphery of the mounting hole of each of the mounting brackets so as to abut on the receiving plane disposed on the mounting seat, each of the mounting brackets being formed into a vertically elongated contour, the mounting hole of each of the mounting brackets being arranged at an upper end of each of the mounting brackets, a further mounting hole being provided at a lower end of each of the mounting brackets and adapted to be fixed to the vehicle body structure.

8. The knee-protecting airbag apparatus according to claim 4, wherein:

each of the mounting brackets has a vertically elongated contour and is provided on both edges in the width direction with reinforcing ribs that project forward; and the retaining lug is configured between the ribs to such size as not to project forward relative to the ribs.

* * * * *